United States Patent
Herkel et al.

(10) Patent No.: US 9,158,289 B2
(45) Date of Patent: Oct. 13, 2015

(54) SAFETY CIRCUIT

(75) Inventors: Peter Herkel, Berlin (DE); Juergen Gewinner, Berlin (DE); Dirk H. Tegtmeier, Berlin (DE)

(73) Assignee: Otis Elevator Company, Farmington, CT (US)

( * ) Notice: Subject to any disclaimer, the term of this patent is extended or adjusted under 35 U.S.C. 154(b) by 586 days.

(21) Appl. No.: 13/639,111

(22) PCT Filed: Apr. 23, 2010

(86) PCT No.: PCT/US2010/032165
§ 371 (c)(1),
(2), (4) Date: Oct. 3, 2012

(87) PCT Pub. No.: WO2011/133163
PCT Pub. Date: Oct. 27, 2011

(65) Prior Publication Data
US 2013/0025976 A1    Jan. 31, 2013

(51) Int. Cl.
*B66B 1/34* (2006.01)
*G05B 9/02* (2006.01)
*B66B 13/22* (2006.01)

(52) U.S. Cl.
CPC .. *G05B 9/02* (2013.01); *B66B 13/22* (2013.01)

(58) Field of Classification Search
CPC .................................. G05B 9/02; B66B 13/22
USPC ................. 187/247, 277, 316, 317, 391, 393;
307/134, 137; 49/26, 28; 324/415, 422
See application file for complete search history.

(56) References Cited

U.S. PATENT DOCUMENTS

| 2,817,774 | A | * | 12/1957 | Kniel et al. | 307/137 |
| 4,266,632 | A | * | 5/1981 | Yoneda et al. | 187/382 |
| 5,523,633 | A | * | 6/1996 | Imaizumi et al. | 307/137 |
| 5,549,179 | A | * | 8/1996 | Herkel et al. | 187/298 |
| 6,446,760 | B1 | * | 9/2002 | Lisi | 187/391 |
| 7,362,011 | B2 | | 4/2008 | Komatsu et al. | |
| 9,057,743 | B2 | * | 6/2015 | Alley | 1/1 |
| 2009/0218176 | A1 | | 9/2009 | Tyni et al. | |

(Continued)

FOREIGN PATENT DOCUMENTS

| CN | 2565125 Y | 8/2003 |
| JP | 1-139322 | 9/1989 |

(Continued)

OTHER PUBLICATIONS

International Preliminary Report on Patentability for International Application No. PCT/US2010/32165 dated Nov. 1, 2012.

(Continued)

*Primary Examiner* — Anthony Salata
(74) *Attorney, Agent, or Firm* — Carlson, Gaskey & Olds

(57) ABSTRACT

An exemplary safety circuit includes a plurality of contacts that are configured to establish a conductive path across the contacts when the contacts are in electrically conductive contact with each other. The contacts selectively interrupt the conductive path across them when the contacts are separated. A controller selectively introduces a voltage pulse across the contacts at a voltage level that is effective to overcome an electrical resistance of any contamination on at least one of the contacts. The controller introduces the voltage pulse at least when the contacts are expected to be in contact to establish the conductive path.

21 Claims, 2 Drawing Sheets

(56) References Cited

U.S. PATENT DOCUMENTS

| | | | | |
|---|---|---|---|---|
| 2013/0146399 | A1* | 6/2013 | De Coi et al. | 187/393 |
| 2014/0312871 | A1* | 10/2014 | Alley | 323/299 |
| 2014/0312909 | A1* | 10/2014 | Alley | 324/415 |
| 2014/0312923 | A1* | 10/2014 | Alley | 324/713 |
| 2014/0320138 | A1* | 10/2014 | Acharya et al. | 324/415 |
| 2014/0320195 | A1* | 10/2014 | Desai et al. | 327/382 |

FOREIGN PATENT DOCUMENTS

| | | |
|---|---|---|
| JP | 6166477 A | 6/1994 |
| JP | H07230750 A | 8/1995 |
| JP | H11234925 A | 8/1999 |
| JP | 2006310287 A | 11/2006 |
| JP | 2009023820 | 2/2009 |

OTHER PUBLICATIONS

First Search for Chinese Patent Application No. 901080066370.5 dated Nov. 26, 2013.

International Search Report and Written Opinion of the International Searching Authority for International application No. PCT/US2010/032165 mailed Jan. 21, 2011.

* cited by examiner

SAFETY CIRCUIT

BACKGROUND

Safety circuits are used in a variety of applications. A safety circuit typically provides a control over a supply of power to a load, for example. One use of safety circuits is within elevator systems. A daisy chain arrangement of safety switches along a hoistway provides an ability to control whether the elevator machine is powered to cause movement of an elevator car. The switches of the safety circuit along the daisy chain are associated with an elevator door component such as a hoistway door lock. Whenever the door component is not in a properly closed position, the safety switch remains open and interrupts a conductive path along the safety chain. Under these conditions, power is not provided to the elevator machine so that the elevator car cannot move. The safety chain therefore provides an ability to prevent elevator car movement in the event that a hoistway door is not closed or properly locked.

Known safety chains in elevator systems operate based on 110 volt AC power. While such systems have proved reliable and useful over the years, there is a desire to reduce power consumption in elevator systems. One opportunity to reduce power consumption would be to introduce a lower power safety chain circuit. This cannot be done, however, without introducing new design challenges and complexities.

SUMMARY

An exemplary safety circuit includes a plurality of contacts that are configured to establish a conductive path across the contacts when the contacts are in electrically conductive contact with each other. The contacts selectively interrupt the conductive path across them when the contacts are separated. A controller selectively introduces a voltage pulse across the contacts at a voltage level that is effective to overcome an electrical resistance of any contamination on at least one of the contacts. The controller introduces the voltage pulse at least when the contacts are expected to be in contact to establish the conductive path.

An exemplary method of operating a safety circuit, which includes a plurality of contacts that are configured to establish a conductive path across the contacts when they are in electrically conductive contact with each other and to selectively interrupt the conductive path when the contacts are separated, includes selectively introducing a voltage pulse across the contacts at a voltage level that is effective to overcome an electrical resistance of any contamination on at least one of the contacts. The voltage pulse can be introduced when the contacts are expected to be in contact to establish the conductive path.

The various features and advantages of the disclosed examples will become apparent to those skilled in the art from the following detailed description. The drawings that accompany the detailed description can be briefly described as follows.

DETAILED DESCRIPTION

Figure 1:
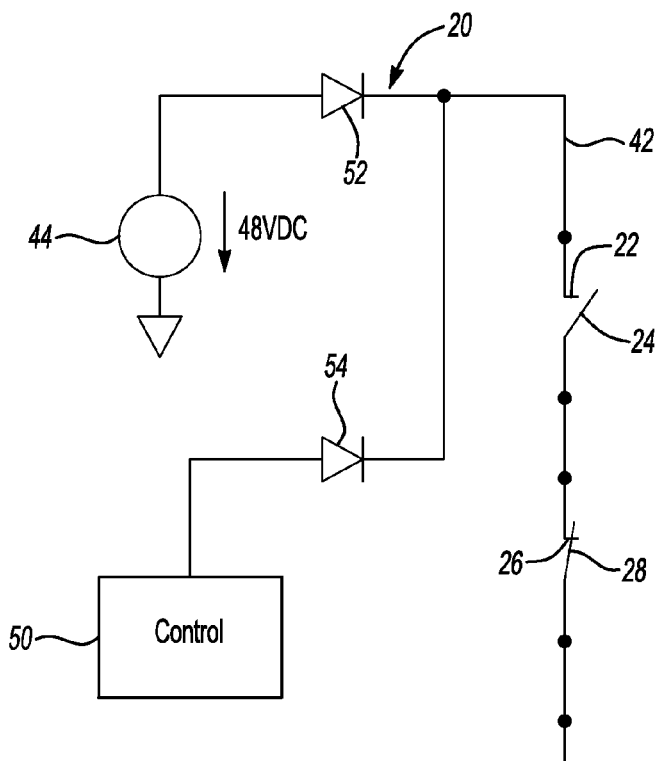
FIG. 1 schematically illustrates an example safety circuit designed according to an embodiment of this invention.

FIG. 1 schematically shows selected portions of a safety circuit 20. A plurality of contacts 22 and 24 are configured to establish a conductive path across the contacts 22 and 24 when the contacts 22 and 24 are in electrically conductive contact with each other. The contacts 22 and 24 selectively interrupt the conductive path across them when they are separated. The contacts 22 and 24 in the example of FIG. 1 are shown in a separated or open condition.

The example safety circuit 20 includes additional contacts 26 and 28 that are configured to be selectively coupled to each other or separated from each other and electrical contacts 30 and 32 that are configured to be coupled to each other or separated from each other.

The example safety circuit 20 includes an energy flow controlling device 40 that controls whether power is provided to a load responsive to the condition or position of the contacts 22-32. In one example, whenever any one of the sets of contacts is separated so that the conductive path across them is interrupted, the energy flow controlling element 40 will not allow power to be provided to the associated load.

In the example of FIG. 1, at least one conductor 42 is associated with the sets of contacts 22-32. A power source 44 provides electrical power that is conducted along the conductor 42 and across the various sets of contacts when they are in a closed position to contact each other. In this example, the power source 44 is a low voltage DC power source. In one example, the power source 44 provides a 48 volt DC power level.

One advantage to using a low voltage DC power source is lower power consumption. One challenge introduced by utilizing a low voltage DC power source instead of a high voltage AC power source, for example, is that a possibility exists for contamination or corrosion to build up on any one of the contacts along the safety circuit 20. Such contamination or corrosion can interfere with an electrically conductive coupling between the associated contacts even though they are in the position in which they otherwise would electrically contact each other. Corrosion or contamination on at least one of the contacts may introduce an electrical resistance that is too high for the relatively low voltage of the low voltage power source 44 to overcome such that the contacts do not appear closed or in contact with each other. Under such circumstances, a false determination is made by the energy flow controlling device 40. Even though the contacts may all be closed, corrosion or contamination on at least one of them preventing the power from the low voltage power source to flow across those contacts will be interpreted by the energy flow controlling device 40 as at least one of the sets of contacts being open.

It is not practical to manually clean the contacts on a regular basis. The illustrated example includes a new way to overcome the effects of such contamination or corrosion. The example of FIG. 1 includes a controller 50 that selectively introduces a voltage pulse across the contacts 22-32 at a voltage level that is effective to overcome an electrical resistance of any contamination or corrosion on at least one of the contacts. The controller 50 in one example introduces a voltage pulse that has a voltage level that is at least twice as high as the voltage of the low voltage power source 44. In one example, the controller 50 introduces a voltage pulse of at least 100 volts to overcome any electrical resistance of any contamination on any of the contacts 22-32.

The electrical pulse introduced by the controller 50 is effective in some examples to clean the contacts and remove any corrosion or contamination from them that was otherwise interfering with an electrical coupling between the contacts.

The example of FIG. 1 includes biasing elements 52 and 54 to prevent the voltage pulse provided by the controller 50 from affecting the low voltage power source 44 and to prevent the voltage of the low voltage power source 44 from affecting the controller 50.

Figure 2:
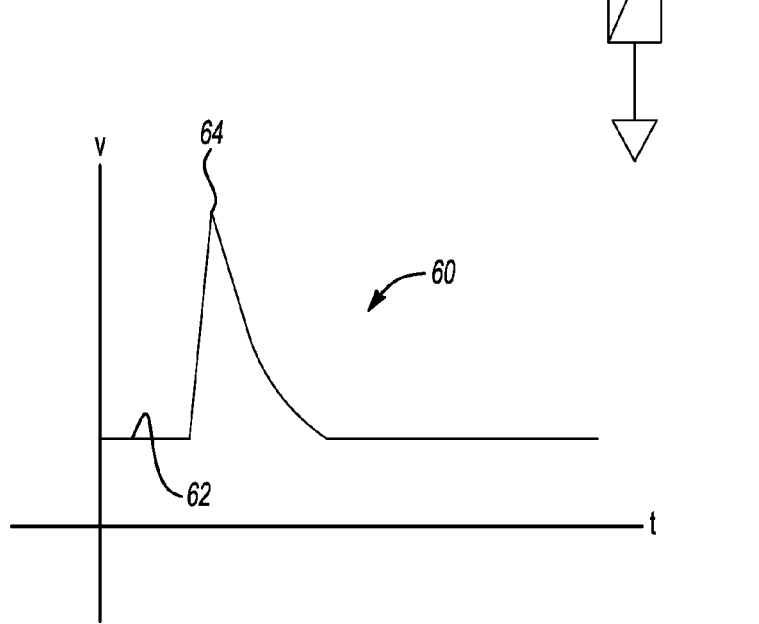
FIG. 2 is a graphical illustration of a voltage pulse application technique.

FIG. 2 includes a graphical representation 60 of a power controlling strategy that is used in one example. A monitoring voltage level is shown at 62 which corresponds to the normal voltage level of the low voltage power source 44. In one example, that voltage level is approximately 48 volts. When it is desired to introduce a voltage pulse to overcome the electrical resistance of any contamination on any of the contacts along the safety circuit, a voltage pulse as shown at 64 is introduced for a relatively short period of time. In this example, the voltage pulse 64 has a peak voltage value of approximately 140 volts. One example includes using at least a 100 volt amplitude for the pulse introduced by the controller 50. After a relatively brief interval, the voltage returns to the voltage level shown at 62 which comprises a relatively low DC voltage monitoring voltage.

In the example of FIG. 1, a conductor 42 extends along the safety circuit 20. In some examples, a physical conductor is not required along the entire safety circuit 20. In such an example, the contacts at one or more location along the safety circuit 20 may communicate wirelessly from one point along the safety circuit to another to provide an indication of whether those contacts are closed. A voltage pulse to overcome any resistance due to any contamination or corrosion on any of the contacts may be used in a configuration that is hardwired, wireless or both.

There are a variety of uses for a safety circuit as shown in the example of FIG. 1. One such use is for controlling power supply in a passenger carrying arrangement. Passenger carrying devices such as elevators, passenger conveyors and trams may include a safety circuit designed according to an embodiment of this invention.

Figure 3:
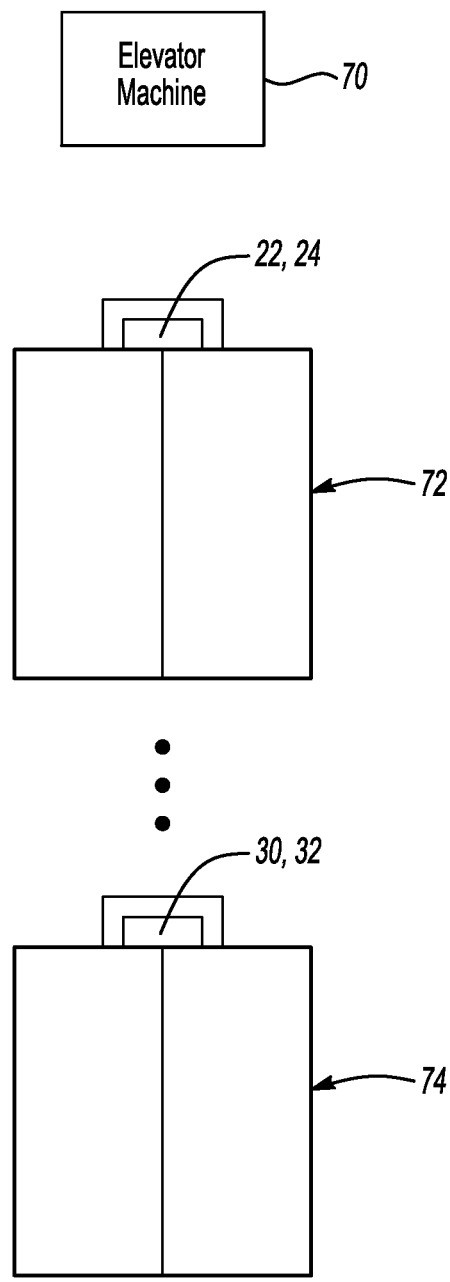
FIG. 3 schematically illustrates selected portions of an example elevator system with which an example embodiment of this invention can be used.

FIG. 3 schematically shows selected portions of an example passenger carrying arrangement. This particular example is an elevator system. The elevator system includes an elevator machine 70 that controls movement of an elevator car. A plurality of elevator doors 72, 74 are situated within the elevator system including elevator car doors and hoistway doors as known. Example elevator system doors 72 and 74 are shown in FIG. 3. The elevator doors 72 have contacts 22 and 24 associated with them in a manner that the contacts are configured to contact each other when the doors 72 are in a properly closed or locked condition. Similarly, the doors 74 have the contacts 30 and 32 associated with them to provide an indication of when the appropriate component of the doors 74 is in a properly closed or locked position. In one example, the contacts are associated with a hoistway door lock to provide an indication of when the associated door is locked. The energy flow controlling device 40 (FIG. 1) will only allow power to the elevator machine 70 in a manner that would allow for an elevator car to move when all of the contacts along the safety circuit indicate that all of the hoistway doors are properly locked, for example.

In one example, prior to an elevator run when an elevator car will accelerate from a stopped position, the controller 50 introduces a voltage pulse along the safety circuit to remove any contamination or corrosion from the contacts and overcome any electrical resistance associated with such contamination or corrosion. In another example, whenever it is expected that all of the contacts will be coupled with each other but at least one set of contacts appears to be separated, the controller 50 introduces the voltage pulse to overcome the effects of any corrosion or contamination on the corresponding contacts. After the voltage pulse is introduced, if the contacts still appear open, a determination is made that a corresponding door component is not in the proper position or condition to allow for the elevator car to move, for example.

In one example, the controller 50 recognizes when the transportation system is in an inspection mode. The controller 50 in such an example prevents the pulse from being introduced across the contacts.

In the illustrated example, the energy of the pulse is limited to a peak voltage that would render any contact between a contact to which the pulse is applied and an individual harmless. There are standards that discuss the effect of current on humans. It is known that the human body can be represented by a resistance of 500 Ohms With a peak voltage of 150V and a peak current of 0.3 amps, the energy of a pulse is 22.5 $A^2s$ and the discharge energy is in the range of 45 µJ. That energy level is perceivable by an individual who touched a contact but is below a pain threshold. Therefore, when appropriate limits are placed on the pulse it may not be necessary to restrict the application of the pulse even during an inspection mode.

The disclosed example approach of introducing a voltage pulse to overcome electrical resistance associated with contamination or corrosion, allows for efficiently incorporating low voltage safety circuits into a variety of situations. The advantage of having a lower power safety circuit can be realized while at the same time avoiding the drawback associated with the potential for contamination or corrosion on at least one of the safety circuit contacts interfering with an ability to properly detect closed contacts.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A safety circuit, comprising:
a plurality of contacts that are configured to establish a conductive path across the contacts when the contacts are in electrically conductive contact with each other and to selectively interrupt a conductive path across the contacts when the contacts are separated; and
a controller that selectively introduces a voltage pulse across the contacts at a voltage level that is effective to overcome an electrical resistance of any contamination on at least one of the contacts, the controller introducing the voltage pulse at least when the contacts are expected to be in contact to establish the conductive path.

2. The safety circuit of claim 1, wherein the voltage pulse voltage level is effective to remove at least some of any contamination on the at least one of the contacts.

3. The safety circuit of claim 2, wherein the voltage pulse voltage level is greater than 100 volts DC.

4. The safety circuit of claim 3, wherein the voltage pulse voltage level is approximately 140 volts DC.

5. The safety circuit of claim 3, comprising
a DC power source coupled with the contacts, the DC power source providing a monitoring voltage across the contacts, the monitoring voltage being below 50 volts DC.

6. The safety circuit of claim 1, comprising
at least one conductor coupled with the contacts such that the contacts selectively interrupt a conductive path along the conductor when the contacts are separated; and a DC power source coupled with the conductor, the DC power source providing a monitoring voltage along the conductor, the monitoring voltage being below 50 volts DC.

7. The safety circuit of claim 1, wherein the contacts are associated with a monitored device having at least one moveable portion, the contacts are configured to be separated responsive to a monitored condition of the moveable portion.

8. The safety circuit of claim 7, wherein the monitored device comprises a door and the contacts are configured to be separated when the door is open.

9. The safety circuit of claim 8, wherein the monitored device comprises a passenger carrying device.

10. The safety circuit of claim 9, wherein the device comprises an elevator and the contacts are configured to be separated when at least one elevator door component is not in a properly closed condition.

11. The safety circuit of claim 9, wherein the controller is configured to introduce the voltage pulse prior to the passenger carrying device accelerating from a stop.

12. A method of operating a safety circuit, which includes a plurality of contacts that are configured to establish a conductive path across the contacts when the contacts are in electrically conductive contact with each other and to selectively interrupt a conductive path across the contacts when the contacts are separated, the method comprising:
    selectively introducing a voltage pulse across the contacts at a voltage level that is effective to overcome an electrical resistance of any contamination on at least one of the contacts when the contacts are expected to be in contact to establish the conductive path.

13. The method of claim 12, comprising
    using the voltage pulse to remove at least some of any contamination on the at least one of the contacts.

14. The method of claim 13, wherein the voltage pulse voltage level is greater than 100 volts DC.

15. The method of claim 13, wherein the voltage pulse voltage level is approximately 140 volts DC.

16. The method of claim 12, comprising
    providing a monitoring voltage across the contacts, the monitoring voltage being below 50 volts DC and wherein the voltage pulse voltage level is at least twice the monitoring voltage.

17. The method of claim 12, comprising
    associating the contacts with a monitored device having at least one moveable portion such that the contacts are separated responsive to a monitored condition of the moveable portion.

18. The method of claim 17, wherein the monitored device comprises a door and the contacts are separated when the door is open.

19. The method of claim 18, wherein the monitored device comprises a passenger carrying device.

20. The method of claim 19, wherein the device comprises an elevator and the contacts are separated when at least one elevator door component is not in a properly closed condition.

21. The method of claim 19, comprising introducing the voltage pulse prior to the passenger carrying device accelerating from a stop.

* * * * *